Dec. 10, 1968
J. C. KOTLARZ
3,415,024
GLAZING PANEL SUPPORTING FRAMEWORK WITH
HEATING AND COOLING SYSTEM
Filed Aug. 9, 1965
2 Sheets-Sheet 1
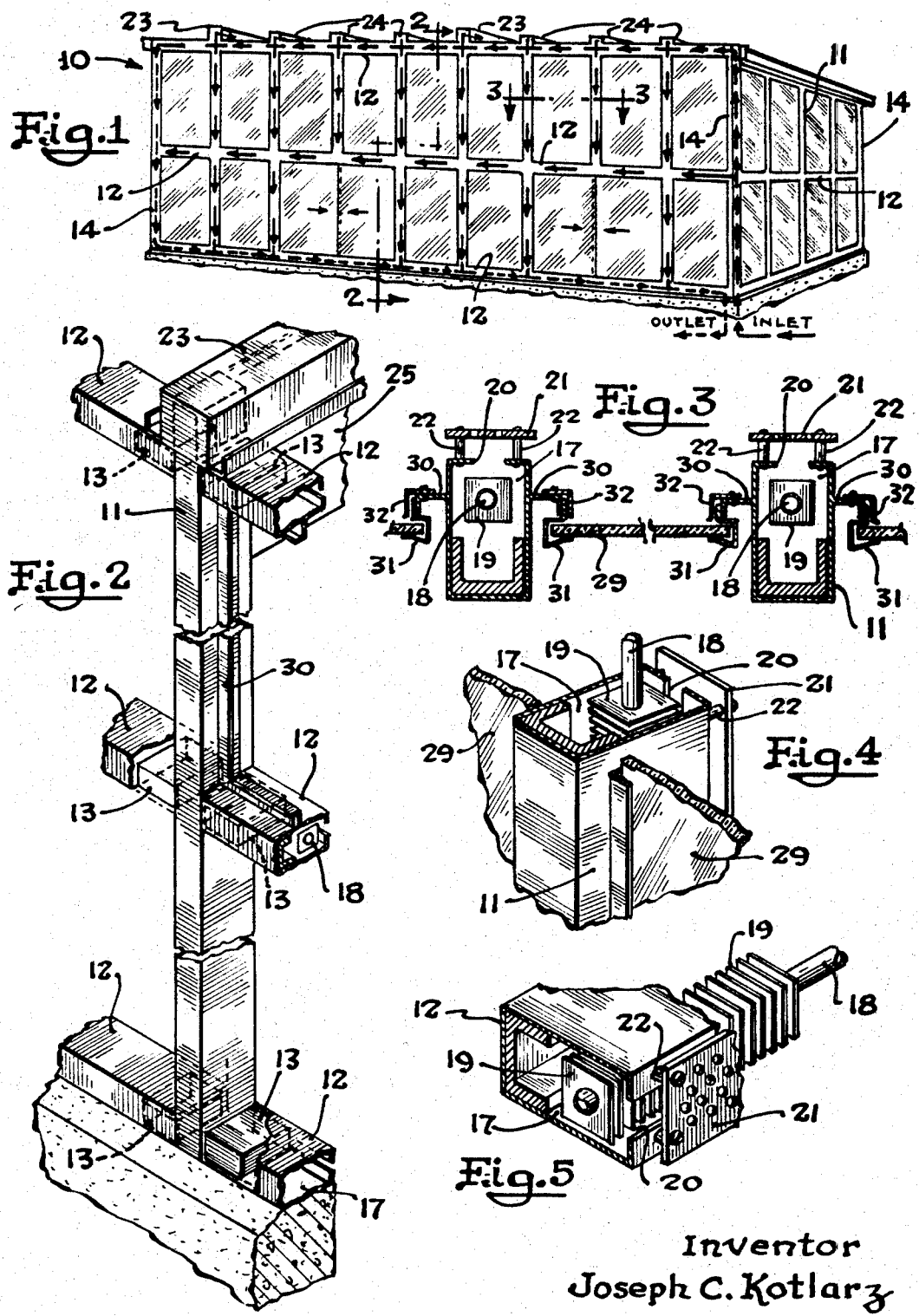
Inventor
Joseph C. Kotlarz
By Gildo E. Fato
Attorney Dec. 10, 1968    J. C. KOTLARZ    3,415,024
GLAZING PANEL SUPPORTING FRAMEWORK WITH
HEATING AND COOLING SYSTEM
Filed Aug. 9, 1965    2 Sheets-Sheet 2
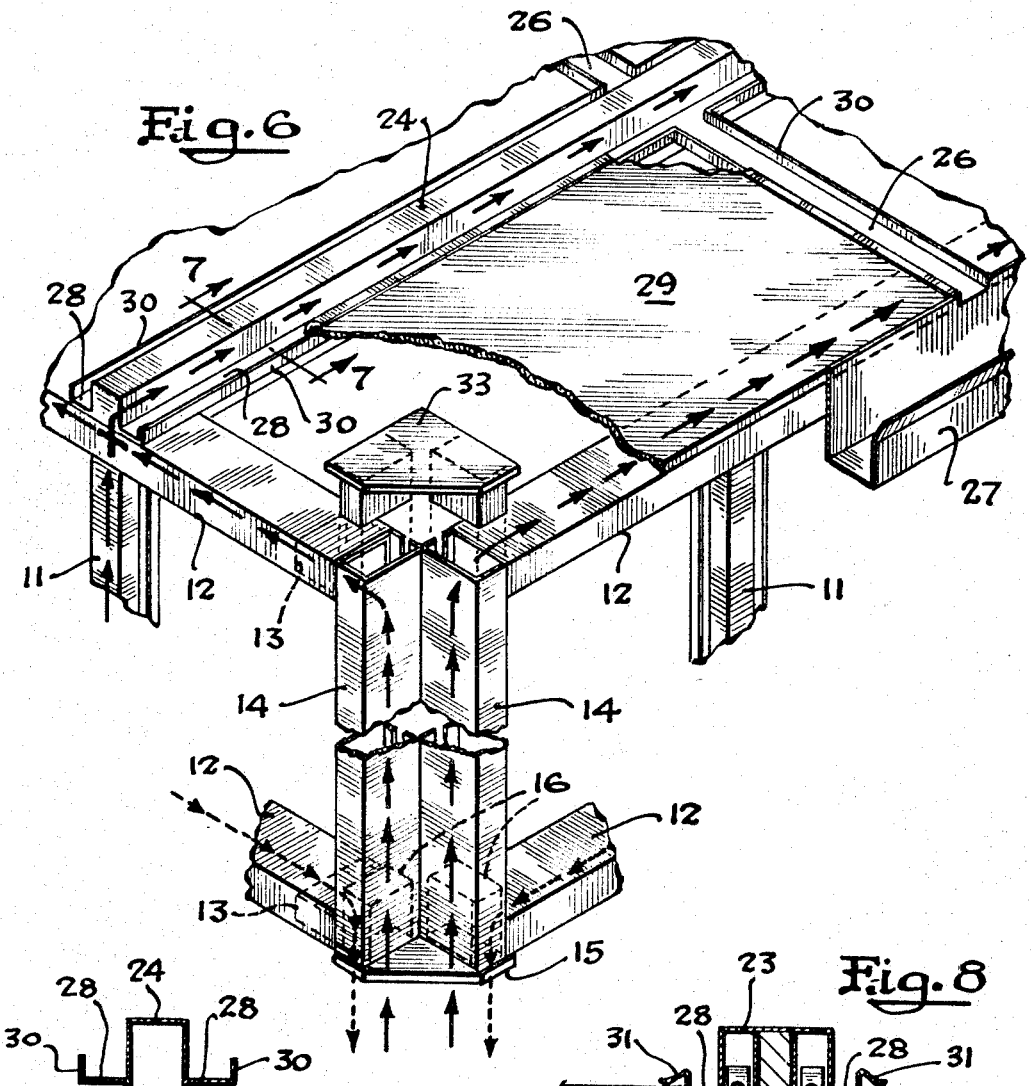
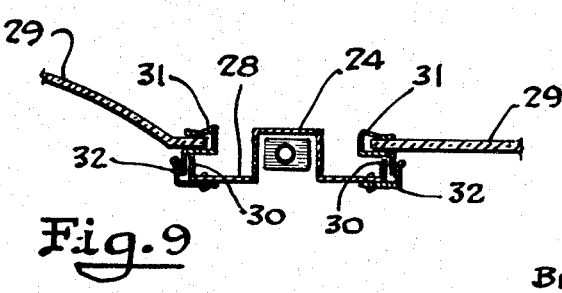
Inventor
Joseph C. Kotlarz
By Gildo E. Fato
Attorney

United States Patent Office 3,415,024
Patented Dec. 10, 1968

3,415,024
GLAZING PANEL SUPPORTING FRAMEWORK WITH HEATING AND COOLING SYSTEM
Joseph C. Kotlarz, 109 W. Woodlawn Drive,
Mundelein, Ill. 60060
Filed Aug. 9, 1965, Ser. No. 478,233
7 Claims. (Cl. 52—220)

ABSTRACT OF THE DISCLOSURE

A glazing panel supporting framework and building structure comprising a supporting framework of generally vertical and horizontal hollow channel-like members having disposed therein a fluid-flow manifold system for heating and cooling the structure in accordance with temperature conditions to thereby minimize the relative expansion and contraction between the supporting framework and the glazing panels. The framework can be utilized for a single wall or a complete building structure and, if desired, each separate wall can contain its own fluid-flow manifold radiant panel heating and chilling zoned control system.

---

This invention relates to building structures and more particularly to the type incorporating glazing panels fitted within a framework structure.

Building structures such as translucent and transparent curtain wall systems, patio, roof systems, skylights, swimming pool enclosures, aircraft hangars, and solariums are commonly constructed of glazing panels, made of, for example, plastic, fitted with a supporting framework. As presently constructed, gaskets, plastic sealing materials such as epoxy resin and the like, or various combinations of the foregoing are used to effect a seal between the glazing panels and the supporting framework. Due to the differing thermal characteristics of the glazing material, generally plastic, and the supporting framework, generally metal; inflexible fastenings such as bolting are not suitable since they do not properly permit expansion and contraction of the glazing panels in relation to the framework structure. Gaskets, sealing materials or combinations thereof are not entirely satisfactory as means of effecting a seal in that due to expansion and contraction of the glazing panels, moisture and air is not effectively sealed out, necessitating frequent replacement of the gaskets or other sealing material. Commonly employed materials for such structures are metal for the supporting framework and glazing panels of rigid and reinforced Plexiglas plastic, which plastic has a relatively large coefficient of thermal expansion ( 0.00004 inch/inch/° F.). In comparison, the coefficient of thermal expansion for aluminum is about 0.000013 inch/inch/° F. Accordingly, adequate provision for expansion and contraction of the material must be made, particularly when large glazing panels are utilized or when outdoor temperatures vary greatly.

The present invention provides a building structure which minimizes the effect of expansion and contraction of the glazing panels and supporting structure. Briefly stated, the building structure of the present invention comprises a supporting framework of hollow channel-like members having disposed therein a fluid-flow manifold system for heating and cooling the structure in accordance with temperature conditions, thereby substantially eliminating the detrimental effects of expansion and contraction of the supporting framework in relation to the glazing panels. With the effects of expansion and contraction substantially eliminated, gaskets or other sealing materials used to seal the glazing panels within the supporting structure are thereby made more effective in sealing out moisture and air and need not be continually replaced or repaired. Depending on temperature conditions, the fluid within the fluid-flow manifold system can be heated or cooled to offset the expansion or contraction of the glazing panels in relation to the supporting framework. A suitable pumping system is utilized to circulate the heating or cooling medium to uniformly heat or cool the framework structure. When the invention is employed with a complete building structure, such as a swimming pool enclosure, each wall and the roof can be provided with its own fluid-flow manifold system. In conjunction with the attendant pumping and temperature control systems, each wall and the roof can thereby be heated or cooled separately. For example, in particularly hot, sunny weather, the roof and the wall facing in a southerly direction can be cooled to a greater extent than the walls lying in the shade. As the sun shifts throughout the day, the cooling of each wall can be regulated accordingly. Conversely, in cold weaher, the walls facing the wind direction can be heated to a greater extent than the sheltered walls or the roof. Thus, by cooling the framework structure in hot weather, by means of fluid flow manifold system, the effects of expansion can be minimized. Conversely, by heating the framework structure in cold weather, the effects of contraction can be minimized.

Means of achieving the foregoing and other advantages of the present invention will be readily understood by reference to the following detailed description when considered in conjunction with the accompanying drawings, in which:

FIGURE 1 is a perspective illustration of a structure in assembled relation and made in accordance with the present invention and schematically illustrating a fluid-flow manifold system.

FIGURE 2 is a partial perspective view taken along the line 2—2 of FIGURE 1;

FIGURE 3 is a partial fragmentary view taken along the line 3—3 of FIGURE 1;

FIGURE 4 is an enlarged view of an assembled vertical section of the framework as viewed from the outside of the structure;

FIGURE 5 is an enlarged view of an assembled horizontal section of the framework as viewed from the inside of the structure;

FIGURE 6 is a partial perspective view showing a corner and roof portion of the framework structure;

FIGURE 7 is a sectional view taken along the line 7—7 in FIGURE 6;

FIGURE 8 is a sectional view showing the truss portion of the structure;

FIGURE 9 is a sectional view showing attachment of the glazing panels to the framework structure.

In the invention illustrated in the foregoing figures, a completed structure, generally indicated at 10, is illustrated in FIGURE 1 and is composed of vertical members 11 and horizontal members 12 generally made of metal. One feature of the structure of the present invention is that it can be assembled and disassembled rapidly with a minimum of effort and labor. When it is desired to erect a structure of the present invention, a corner member 14, illustrted in FIGURE 6, is placed over the protruding vertical portion 16 of a base anchor plate 15. All of the vertical supporting members 11 and the corner members 14 have horizontal portions 13 extending therefrom. In the structure 10 illustrated in FIGURE 1, all of the glazing panels are of the same size and therefore, all of the horizontal portions 13 are spaced apart identically on all vertical supporting members 11. After a corner member 14 is erected on a base anchor plate 15, horizontal members 12 are slipped over the horizontally extending portions 13 of the corner member 14. At the same time, the opposing ends of the horizontal members 12, which have been slipped over the horizontally extending portions 13 of the corner member 14, are slipped over the horizontally extending portions 13 of a vertical supporting member 11. In this manner, the framework for two glazing panels, one above the other, and extending at right angles from the corner member 14 has been formed. For greater rigidity horizontal members 12 can be fastened to the horizontally extending portions 13 by means of machine screws or other suitable fasteners. The procedure is repeated, slipping horizontal members 12 over the horizontally extending portions 13 of the last to be erected vertical supporting members 11, until all four walls of the structure 10 have been erected. As each corner is reached the procedure for erecting the corner member 14, as previously described, is repeated.

During the erection of the walls, construction of the fluid-flow manifold system, contained within the hollow portions 17 of the horizontal members 12 and the vertical supporting members 11, is started. Before each horizontal member 12 or vertical supporting member 11 is put in place, a conduit member 18 is slipped into the hollow portion 17 of the supporting member. After the wall is completed, the conduit members 18 are hooked together, as will hereinafter be described, to form a continuous flow path for the fluid medium, thereby comprising a fluid-flow manifold system, all contained within the horizontal members 12 and vertical supporting members 11.

As illustrated in FIGURES 3, 4 and 5, the vertical supporting members 11 and horizontal members 12 are channel-like in shape, having a transverse slot 20 on one side thereof. The slot 20 provides access to the inside of the framework for easy assembly of the fluid-flow manifold system and for future repairs or modifications. After the wall portions are assembled, with conduit members 18 in place, the separate conduit members 18 within each horizontal member 12 or vertical supporting member 11 are joined together with snap-type fittings (not shown), for example, cross-T's may be utilized at the juncture of horizontal members 12 and vertical supporting members 11 to joint together the four converging conduit members 18, or if desired, couplings may be employed to separately join together the horizontal and vertical conduit members 18 so that they by-pass each other. As has been previously described, each wall portion may be constructed with its own fluid-flow manifold system or, if desired, the conduit members 18 may be interconnected throughout the entire building structure to provide a single, continuous fluid-flow path for a heating or cooling medium.

A suitable fluid-flow arrangement is illustrated schematically by the arrows in FIGURE 1 and FIGURE 6. As illustrated, fluid is pumped upward through the conduit member 18 within one of the corner members 14. Suitable T-connections are utilized at the junctures with the horizontal members 12, adjacent to the corner member 14. T-connections are also employed at the juncture of the horizontal members 12 which lie in the plane of the roof and the vertical members 11. At the intersections of the horizontal members 12 and vertical members 11, couplings are employed to separately join together the horizontal and vertical conduit members 18, respectively, so that they by-pass each other. In this fashion, the conduit members 18 within the corner member 14 opposite to the first described corner member and the conduit members 18 within the horizontal members 12 lying at ground level form a return line for the fluid and direct it back to the pump (not shown) and heating and cooling equipment (not shown). Various fluid-flow arrangements may be devised to suit the contemplated use of the finished building structure and depending on the conditions to which it will be subjected.

After the conduit members 18 have been joined together to form the desired fluid-flow path, as has been previously described, the transverse slots 20 in the horizontal members 12 and vertical supporting members 11 may be covered by a removable panel or other suitable means. In the embodiment illustrated in FIGURES 3, 4 and 5, a perforated grill 21 is fastened over the slots 20 by means of removable screws 22. Thus, accidental access to the fluid-flow manifold system is prevented while at the same time, the grill 21 may be easily removed in the event of needed repairs or modifications. The perforated grill 21 also facilitates some heating or cooling of the inside of the structure as the fluid-flow manifold system is being operated in accordance with temperature conditions. After the walls are erected, a cap 33 is placed over the top of each of the corner members 14, as can be seen in FIGURE 6. With the walls erected, construction of the roof can be undertaken. Main trusses 23 and sub-trusses 24 are put in place in line with and coplanar with each vertical supporting member 11. As illustrated, a main truss 23 is placed in line with every fifth vertical supporting member 11. As illustrated in FIGURES 2 and 8, main truss 23 has a supporting member 25 for added strength. For lightness, while at the same time providing the required strength, supporting member 25 may be made of rigid honeycomb plastic web panel. Generally, main trusses 23 and sub-trusses 24 are simply laid in place, but if desired, they can be bolted to the wall portions or otherwise fastened down in any suitable fashion. Purlins 26 are spaced apart between adjacent sub-trusses 24 and transversely thereto and extend from one wall to the other. Together with the trough-like portions 28 of the sub-trusses 24, the purlins 26 provide a flow path into the gutter 27 for rain and melting snow. Also, together with the sub-trusses 24 the purlins 26 provide a framework for the glazing panels 29, which may be dome shaped or flat, as illustrated in FIGURE 9.

After the building structure framework, comprising the walls and roof, has been completed, the glazing panels 29 can be installed. All of the horizontal members 12, vertical supporting members 11, main trusses 23, sub-trusses 24 and purlins 26 have an extending L-shaped flange 30 thereon to which is affixed the glazing panel 29 locking hardware, as best illustrated in FIGURES 8 and 9. The glazing panels 29 are fitted within a glazing frame 31 which is then spot welded or otherwise fastened to a hinge member 32. The hinge members 32 are then bolted to the flanges 30 of the respective supporting members, trusses or purlins. Gaskets, plastic sealing tape, epoxy resins, or other sealing means may be placed around the glazing frames 31 to seal the glazing panels 29 therein and prevent the intrusion of moisture and air into the building structure.

As has been described, the framework structure of the present invention containing a fluid-flow, heating and cooling manifold system, minimizes the effect of expansion and contraction of the glazing panels and supporting framework with respect to each other, thereby preventing failure of the sealing materials and attendant deterioration of the structure. While the invention has been described in terms of a complete building structure, it is understood that the invention can be employed in other framework forms such as skylights, domed roof structures and the like.

Others can readily adapt the present invention in other specific forms by employing one or more of the novel features disclosed or equivalents thereof. All such practice of the invention is considered to be a part hereof provided it falls within the scope of the appended claims.

What is claimed is:

1. A building structure having wall portions and a roof portion, said wall portions comprising parallel spaced horizontally and vertically disposed supporting members arranged in transverse relation to each other, said horizontal and vertical members being of channel cross-section and having a continuous longitudinal slot on one side thereof and a longitudinally extending flange portion on two sides thereof, said vertical supporting members having spaced horizontal projections extending therefrom to receive the horizontal members thereby forming a framework structure with the vertical members; said roof portion comprising a plurality of parallel spaced main truss and sub-truss members of tubular cross-section, said truss members being positioned coaxially and coplanar with each vertical supporting member; spaced purlin members secured together in transverse relation to the truss members, said truss members and purlin members having a longitudinally extending flange portion on two sides thereof, the truss members and purlin members forming a framework structure; glazing panels fitted within the framework structures formed by the horizontal members, vertical members, truss members and purlins, said glazing panels having a glazing frame affixed to the periphery thereof; hinge members securing said glazing frames to the flange portions of the horizontal members, vertical members, truss members and purlins in secure abutting relation; and a fluid-flow heating and cooling manifold system contained within the horizontal members, vertical members and truss members, said fluid-flow manifold system being effective to minimize the expansion and contraction of the glazing panels and glazing frames in relation to the framework structures and comprising a plurality of interconnected conduit members disposed within the horizontal members, vertical members and truss members; and removable panels secured to the horizontal members and vertical members over the longitudinal slots therein to cover the openings and provide access to the fluid-flow manifold system.

2. A building structure having wall portions and a roof portion said wall portions comprising parallel spaced, hollow, horizontally and vertically disposed members arranged in transverse relation to each other, said horizontal members being engaged with said vertical members at preselected vertical heights thereon to form a framework structure with the vertical members; said roof portion comprising a purality of hollow, parallel spaced truss members and a plurality of purlin members arranged in transverse relation to the truss members, said truss members and purlin members forming a plurality of framework structures; glazing panels fitted within the framework structures formed by the horizontal members, vertical members, truss members and purlins; fastening means affixing said glazing panels to the framework structures formed by the horizontal members, vertical members, truss members and purlins in secure abutting relation; and a fluid-flow manifold system disposed within the horizontal members, vertical members and truss members, said fluid-flow manifold system being effective to minimize the expansion and contraction of the glazing panels in relation to the framework structures and comprising a plurality of interconnected conduit members disposed within the horizontal members, vertical members and truss members.

3. A building structure having wall portions and a roof portion, said wall portions comprising spaced, hollow, generally horizontally and vertically disposed members arranged in angular relation to each other, said generally horizontal members being engaged with said generally vertical members at preselected heights thereon to form a framework structure with the generally vertical members; said roof portion comprising a plurality of hollow, spaced truss members and a plurality of cross members disposed in angular relation to said truss members, said truss members and cross members forming a framework structure; glazing panels fitted within the framework structures formed by the generally horizontally and vertically disposed members and the truss members and cross members; fastening means affixing said glazing panels to said framework structures; and a fluid-flow manifold system disposed within the generally horizontal and vertical members and the truss members, said fluid-flow manifold system being effective to minimize the expansion and contraction of the glazing panels in relation to the framework structures and comprising a plurality of interconnected conduit members disposed within the generally horizontal and vertical members and the truss members.

4. A building structure having wall portions and a roof portion, said wall portions comprising spaced, hollow, generally horizontally and vertically disposed members arranged in angular relation to each other, said generally horizontal members being engaged with said generally vertical members at preselected heights thereon to form a framework with the generally vertical members, said generally horizontal and vertical members having a longitudinal, outwardly extending flange portion on two sides thereof; said roof portion comprising a plurality of hollow, spaced truss members, each of said truss members being positioned in line with opposing generally vertically disposed members; spaced purlin members secured together in angular relation to the truss members, said truss members and purlin members having a longitudinal, outwardly extending flange portion on two sides thereof, the truss members and purlin members forming a framework structure; glazing panels fitted within the framework structures formed by the generally horizontally and vertically disposed members and truss members and purlin members, said glazing panels having a glazing frame affixed to the periphery thereof; fastening means affixing said glazing frames to the framework structures formed by the generally horizontally, anc vertically disposed members and truss members and purlin members in secure abutting relation; and a fluid-flow manifold system disposed within the generally horizontally and vertically disposed members and the truss members, said fluid-flow manifold system being effective to minimize the expansion and contraction of the glazing panels in relation to the framework structures and comprising a plurality of interconnected conduit members disposed within the generally horizontally and vertically disposed members and the truss members.

5. A building wall roof supporting structure having a plurality of wall portions, each of said wall portions comprising spaced, hollow generally horizontally and vertically disposed members arranged in angular relation to each other, said generally horizontal members being engaged with said generally vertical members at preselected heights thereon to form a plurality of framework structures with the generally vertical members, said generally horizontal and vertical members having a longitudinally outwardly extending flange portion on two sides thereof; glazing panels fitted within the framework structures formed by the generally horizontally and vertically disposed members, said glazing panels having a glazing frame affixed to the periphery thereof; fastening means affixing said glazing frames to the framework structures formed by the generally horizontally and vertically disposed members in secure abutting relation, said fastening means comprising hinge members adapted to secure the glazing frames to the framework structures; and a fluid-flow manifold system disposed within the generally horizontally and vertically disposed members, said fluid-flow manifold system being effective to minimize the expansion and contraction of the glazing panels in relation to the framework structures and comprising a plurality of interconnected conduit members disposed within the generally horizontally and vertically disposed members.

6. A glazing panel supporting framework structure comprising a plurality of framework structures defined by spaced, hollow angularly disposed supporting members, each of said framework structures comprising generally horizontally and vertically disposed supporting members arranged in angular relation to each other, said generally horizontally and vertically disposed members having a longitudinal, outwardly extending flange on two sides thereof, one of said members having spaced projecting portions extending therefrom to receive the other of said members, thereby forming a framework structure; glazing panels fitted within the framework structures formed by the generally horizontally and vertically disposed supporting members, said glazing panels having a glazing frame affixed to the periphery thereof; hinge members securing said glazing frames to the flange portions of the generally horizontally and vertically disposed members in secure abutting relation; and a fluid-flow manifold system contained within the generally horizontally and vertically disposed members, said fluid-flow manifold system being effective to minimize the expansion and contraction of the glazing panels and glazing frames in relation to the framework structures and comprising a plurality of interconnected conduit members disposed within the generally horizontally and vertically disposed members.

7. A building wall framework structure comprising a plurality of framework structures defined by spaced, hollow supporting members arranged in coplanar relationship, each of said framework structures comprising parallel spaced, hollow horizontally and vertically disposed members arranged in transverse relation to each other, said horizontal members being engaged with said vertical members at preselected vertical heights thereon to form a framework structure with the vertical members; glazing panels fitted within the framework structures formed by the horizontal and vertical members, said glazing panels having a glazing frame affixed to the periphery thereof; fastening means affixing said glazing frames to the framework structures formed by the horizontal and vertical members in secure abutting relation, said fastening means comprising hinge members adapted to secure the glazing frames to the framework structures; and a fluid-flow manifold system disposed within the horizontally and vertically disposed members, said fluid-flow manifold system being effective to minimize the expansion and contraction of the glazing panels in relation to the framework structures and comprising a plurality of interconnected conduit members disposed within the horizontally and vertically disposed members.

References Cited

UNITED STATES PATENTS

| | | | |
|---|---|---|---|
| 2,970,676 | 2/1961 | Maciunas | 52—262 |
| 2,079,635 | 5/1937 | Sharp | 52—200 |
| 3,050,134 | 8/1962 | Multin | 52—220 |

OTHER REFERENCES

Engineering News Record, Apr. 1, 1948, p. 65.

JOHN E. MURTAGH, *Primary Examiner.*

U.S. Cl. X.R.

52—235, 573; 137—360; 165—53